Feb. 13, 1934.    M. SCHENKEL    1,947,063
PROTECTION OF CONTROLLED RECTIFIERS
Filed April 27, 1932
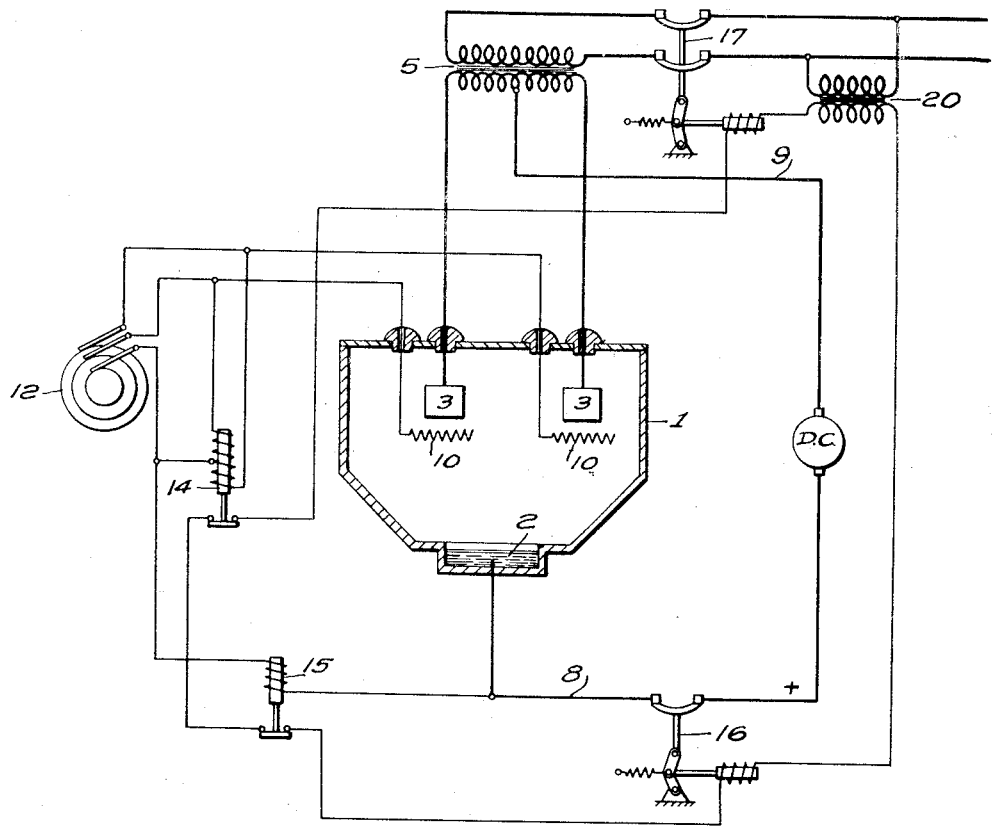
WITNESSES:
E. A. M'Closkey.
S. A. Sticklett
INVENTOR
Moritz Schenkel.
BY O. B. Buchanan
ATTORNEY Patented Feb. 13, 1934

1,947,063

UNITED STATES PATENT OFFICE 1,947,063

PROTECTION OF CONTROLLED RECTIFIERS

Moritz Schenkel, Berlin-Charlottenburg, Germany, assignor to Westinghouse Electric & Manufacturing Company, a corporation of Pennsylvania Application April 27, 1932, Serial No. 607,761, and in Germany April 30, 1931

5 Claims. (Cl. 175—363)

My invention relates to vapor electric devices and particularly to such devices used as rectifiers or frequency changers.

It is customary to provide voltage control in many types of vapor electric converters. In cases where it is desirable to supply a load at a voltage lower than the supply voltage or natural voltage of the device, it is customary to control the voltage by a control device which prevents ignition of the arc until after the peak of the sine wave of the supply voltage has passed. If, for any reason, the control means should be inoperative, the vapor electric device probably would continue to operate as an uncontrolled converter and supply an output voltage in excess of that desired.

It is an object of my invention to provide a controlled rectifier having means for disconnecting the device upon failure of the control means. The device, according to my invention, comprises an under-voltage and a back-current relay connected with the control device so that any failure of the control potential would disconnect the rectifier either from the load or the supply circuit or both.

Other objects and advantages of my invention will be apparent from the accompanying specification taken in conjunction with the accompanying drawing, in which The figure is a schematic diagram of a rectifier embodying my invention.

The device, according to my invention, comprises an evacuated chamber 1 having a vaporizing cathode 2 and a plurality of anodes 3, the anodes 3 being connected to a suitable alternating current supply system 5. The cathode 2 is connected to the positive side of a load circuit 8, while the negative side 9 returns in any suitable manner to the alternating supply circuit. Suitable voltage control devices herein shown as grids 10 are supplied for controlling the instant of ignition of the arc between the cathode and the anodes. A control potential is supplied to these grids by a suitable voltage source 12 which may be an independent generator, phase converter or other suitable source of potential.

A voltage relay 14 is connected across the terminals of this potential device and a suitable back-current relay 15 is placed in one or more of the voltage leads. Upon the occurrence of an abnormal condition in the control voltage, either the voltage relay or the current relay or both will open a circuit embodying circuit breakers 16 and 17 in the direct current and the alternating current systems respectively. Preferably, the relay system is energized by a transformer 20 connected in the alternating system 5 so that failure of alternating voltage will also automatically disconnect the rectifier from both the alternating and direct current systems.

While I have shown and described a specific embodiment of my invention, it is apparent that changes and modifications can be made therein without departing from the spirit and scope of my invention. I desire, therefore, that only such limitations shall be imposed as are included in the accompanying claims or as may be necessitated by the prior art.

I claim as my invention:

1. An electrical system comprising an A. C. supply circuit, a D. C. load circuit, a grid controlled rectifier for connecting the circuits, a source of control potential for the rectifier and a relay operative on failure of the control voltage for disconnecting the supply circuit of the rectifier.

2. An electrical system comprising and A. C. supply circuit, a D. C. distribution circuit, a vapor electric device for transferring energy from the A. C. to the D. C. circuit, grid means in the rectifier for controlling the voltage supplied to the D. C. circuit, means for supplying a controlling voltage to the grid means and a relay in the grid circuit for disconnecting the vapor electric device upon failure of the control voltage.

3. A rectifier system comprising a D. C. circuit, an A. C. circuit, a rectifier for connecting the circuits, means for controlling the ignition point of the rectifier, a source of potential for said control means and a voltage sensitive relay responsive to an abnormal condition of the control voltage for disconnecting the rectifier.

4. A protective system for a control rectifier comprising an A. C. supply circuit, a D. C. load circuit, a vapor electric device for supplying current to the D. C. circuit from the A. C. circuit, a grid in the vapor electric device for controlling the voltage of the D. C. circuit, a source of potential for the grids, an under voltage relay connected to said source and a breaker in the A. C. circuit responsive to operation of the relay to disconnect the device from the supply circuit.

5. A protective system for a controlled rectifier comprising an evacuated chamber, a plurality of electrodes therein, grid means for controlling the ignition of an arc between the electrodes, a source of potential connected to said grid means and an undervoltage relay connected to said source of potential said relay being operative to disconnect the rectifier upon the occurrence of reduced control voltage.

MORITZ SCHENKEL.